United States Patent
Wang et al.

(10) Patent No.: US 9,996,795 B2
(45) Date of Patent: Jun. 12, 2018

(54) GENERATING A NON-DETERMINISTIC MODEL OF A PROCESS FOR A GOAL

(75) Inventors: Yin Wang, Sunnyvale, CA (US); Ahmed Nazeem, Atlanta, GA (US)

(73) Assignee: EntIT Software, LLC, Sunnyvale, CA (US)

( * ) Notice: Subject to any disclaimer, the term of this patent is extended or adjusted under 35 U.S.C. 154(b) by 1003 days.

(21) Appl. No.: 14/347,958

(22) PCT Filed: Oct. 7, 2011

(86) PCT No.: PCT/US2011/055390
§ 371 (c)(1),
(2), (4) Date: Mar. 27, 2014

(87) PCT Pub. No.: WO2013/052063
PCT Pub. Date: Apr. 11, 2013

(65) Prior Publication Data
US 2014/0236554 A1    Aug. 21, 2014

(51) Int. Cl.
| | |
|---|---|
| G06G 7/48 | (2006.01) |
| G06Q 10/00 | (2012.01) |
| G06N 5/00 | (2006.01) |
| G06Q 10/10 | (2012.01) |
| G06Q 30/06 | (2012.01) |

(52) U.S. Cl.
CPC .............. G06N 5/00 (2013.01); G06Q 10/10 (2013.01); G06Q 30/06 (2013.01)

(58) Field of Classification Search
CPC .......... G06N 5/00; G06Q 10/10; G06Q 30/06; G06Q 10/06; G06Q 10/0637; G06F 8/35
USPC ................... 703/6; 717/104; 705/7, 7.38
See application file for complete search history.

(56) References Cited

U.S. PATENT DOCUMENTS

| | | | |
|---|---|---|---|
| 7,543,269 B2 | 6/2009 | Krueger et al. | |
| 7,840,669 B2 | 11/2010 | Dutta et al. | |
| 8,752,002 B2* | 6/2014 | Banavar | G06Q 10/00 717/104 |
| 2004/0249645 A1 | 12/2004 | Hauser et al. | |
| 2006/0235733 A1 | 10/2006 | Marks | |
| 2007/0094059 A1 | 4/2007 | Dawkes et al. | |

(Continued)

OTHER PUBLICATIONS

Wang et al. (Artifact-Centric Business Process Synthesis Framework Using Discrete Event Systems Theory, Apr. 2011 (17 pages)).*

(Continued)

*Primary Examiner* — Andre Pierre Louis (57) ABSTRACT

A method and a system of generating a non-deterministic model of an artifact system for a received goal are provided. A description of artifacts and services associated with an original version of a process is received. Component automata represent the artifacts and services that are automatically generated. There is one component automaton for each attribute of an artifact. States of a particular component automaton represents potential values of a particular attribute and transitions between the states represent services that operate on the values. A non-deterministic model of the process is generated by automatically generating a composite automaton, which includes the component automata, based on the received goal. The composite automaton provides the non-deterministic model of the process.

17 Claims, 4 Drawing Sheets

(56) References Cited

U.S. PATENT DOCUMENTS

| | | | |
|---|---|---|---|
| 2007/0150387 A1* | 6/2007 | Seubert | G06Q 10/10 705/31 |
| 2008/0229275 A1 | 9/2008 | Weber | |
| 2008/0229276 A1* | 9/2008 | Koehler | G06F 8/35 717/104 |
| 2009/0228886 A1 | 9/2009 | Kowalkiewicz et al. | |
| 2010/0082556 A1* | 4/2010 | Srinivasan | G06F 8/72 707/693 |

OTHER PUBLICATIONS

Christian Fritz et.at; "Automatic Construction of Simple Artifact-based Business Processes"; ICDT 2009, Mar. 23-25, 2009, Saint Petersburg, Russia.

International Search Report, PCT/US2011/055390, dated Apr. 18, 2012, 9 pages.

Niels Lohmann; "Compliance by Design for Artifact-centric Business Processes"; Universitat Rostock, Institute fur Informatik, 18051 /rostock, Germany; niels.lohmann@uni-rostock.de (2011).

Google LLC, "Google Checkout Service," 2011, http://payments.google.com/seller/fees.html.

Karsten Schmidt, "Controllability of Open Workflow Nets," Humboldt-Universitat zu Berlin, 2005, pp. 236-249, Berlin, Germany.

Agarwal et al., "A Service Creation Environment Based on End to End Composition of Web Services," 2005 pp. 128-137, International World Wide Web Conference Committee, Chiba, Japan.

Albert et al., "A Constrained Object Model for Configuration Based Workflow Composition," 2005, pp. 102-115, Business Process Management Workshops.

Berardi et al., "Automatic Composition of E-Services That Export Their Behavior," 2003, pp. 43-58, International Conference on Service Oriented Computing, Germany.

Bhattacharya et al., "Towards Formal Analysis of Artifact-Centric Business Process Models," 2007, pp. 288-304, Business Process Management.

Bultan et al., "Conversation Specification: A New Approach to Design and Analysis of E-Service Composition," 2003, pp. 403-410, International World Wide Web Conference Committee, Budapest, Hungary.

Cangialosi et al., "Conjunctive Artifact-Centric Services," 2010, pp. 318-333, International Conference on Service Oriented Computing.

Cassandras et al., "Introduction to Discrete Event Systems," 2008, Springer, U.S.

Chao et al., "Artifact-Based Transformation of IBM Global Financing," 2009, pp. 261-277, Business Process Management, Springer-Verlag, Germany.

Fritz et al., "Automatic Construction of Simple Artifact-based Business Processes," 2009, pp. 225-238, Association for Computing Machinery, St. Petersburg, Russia.

Gerede et al., "Static Analysis of Business Artifact-centric Operational Models," 2007, pp. 133-140, Service Oriented Computing and Applications.

Gerede et al., "Specification and Verification of Artifact Behaviors in Business Process Models," 2007, pp. 181-192, International Conference on Service Oriented Computing.

De Giacomo, et al., "Composition of Partially Observable Services Exporting their Behaviour," 2009, Association for the Advancement of Artificial Intelligence.

De Giacomo, et al., "Automated Composition of Nondeterministic Stateful Services," 2009, pp. 146-160, Web Services and Formal Methods.

Gierds et al., "Reducing adapter synthesis to controller synthesis," 2010, pp. 72-85, IEEE Transactions on Services Computing.

Hassen et al., "Protocol-Based Web Service Composition," 2008, pp. 38-53, International Conference on ServiceOriented Computing, Springer-Verlag, Germany.

Iordache et al., "Petri Nets and Programming: A Survey," 2009, pp. 4994-4999, American Control Conference, St. Louis, Mo., USA.

Lin et al., "On Observability of Discrete-Event Systems," Apr. 1988, pp. 173-198, Information Sciences, vol. 44, Issue 3.

Lohmann et al., "Realizability is controllability," 2009, pp. 110-127, Web Services and Formal Methods.

Lohmann et al., "Artifact-centric choreographies," 2010, pp. 32-46, International Conference on Service Oriented Computing.

Meyer et al., "Automated Service Composition using Heuristic Search," 2006, pp. 81-96, Business Process Management.

Narayanan et al., "Simulation, Verification and Automated Composition of Web Services," 2002, pp. 77-88, International World Wide Web Conference Committee, Honolulu, Hawaii, USA.

Nau et al., "Automated Planning: Theory and Practice," 2004, Morgan Kaufmann Publishers, Inc., San Francisco, California, USA.

Ragone et al., "Fully Automated Web Services Orchestration in a Resource Retrieval Scenario," 2005, pp. 427-434, International Conference on Web Services.

Ramadge et al., "Supervisory Control of a Class of Discrete Event Processes," 1987, pp. 206-230, vol. 24, No. 1, SIAM Journal on Control and Optimization.

Riabov et al., "Wishful Search: Interactive Composition of Data Mashups," 2008, pp. 775-784, International World Wide Web Conference Committee, Beijing, China.

Rudie et al., "Think Globally, Act Locally: Decentralized Supervisory Control," Nov. 1992, pp. 1692-1708, IEEE Transactions on Automatic Control, vol. 37, No. 11.

Shen et al, "On Completeness of Web Service Compositions," Jul. 2007, pp. 800-807, IEEE International Conference on Web Services, Salt Lake City, Utah, USA.

Srinivasmurthy et al., "Web2Exchange: A Model-Based Service Transformation and Integration Environment," 2009, pp. 324-331, IEEE International Conference on Services Computing, Bangalore, India.

Wang et al., "Gadara: Dynamic Deadlock Avoidance for Multithreaded Programs," 2008, pp. 281-294, 8th USENIX Symposium on Operating Systems Design and Implementation.

Wang et al. "Discrete Control for Safe Execution of IT Automation Workflows," 2007, EuroSys, Lisboa, Portugal.

Wang et al,. "The Theory of Deadlock Avoidance via Discrete Control," 2009, pp. 252-263, POPL, Savannah, Georgia, USA.

Wang et al., "A Language-Based Framework for Analyzing Service Representation Models and Service Composition Approaches," 2010, IEEE International Conference on e-Business Engineering.

\* cited by examiner

GENERATING A NON-DETERMINISTIC MODEL OF A PROCESS FOR A GOAL

BACKGROUND

With the advent of the internet, there are business processes, such as Google Checkout, that merchants want to interface with. Traditionally, the merchants have analyzed the documentation of the interfaces provided by the companies providing the processes to determine what interfaces the merchant wants in order to modify or create the merchant's system to communicate with the business process in a desired manner. One way of doing this has involved the merchant manually creating business rules that enable them to modify or create their system to communicate with the business process in a desired manner.

BRIEF DESCRIPTION OF THE DRAWINGS

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "detecting," "determining," "operating," "using," "accessing," "transitioning," "comparing," "associating," "requesting," "communicating," "creating," "obtaining," "modifying," "storing," "receiving," "generating," "providing," "selecting," "executing," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

As discussed herein, traditionally, merchants have manually created business rules that enable them to modify or create their system to integrate a business process in a desired manner. In contrast, business rules, for example in the form of a supervisor, are automatically generated and used to modify or create the merchant's system in a desired manner. According to one embodiment, artifacts and services of an original version of a business process are modeled as automata, as a part of automatically generating business rules. An artifact, according to one embodiment, is a business object, such as a sales order.

More specifically, an artifact system consists of artifacts and services, to be translated into component automata, according to one embodiment. Each component automaton represents an attribute of an artifact of the business process, according to one embodiment. Based on a business goal, a subset of the component automata can be selected and integrated using a composition operation resulting in a composite automaton. According to one embodiment, the composite automaton captures possible behaviors of the artifact system, but does not provide business rules to guide the execution toward the merchant's business goal. Control synthesis can be used to generate (also known as "synthesizing") business rules automatically and represent them as state transition pairs in a supervisor.

According to one embodiment, attributes of artifacts and services of an original version of a process, such as Google Checkout Services (GCS), are received. According to one embodiment, a composite automaton, which is new version of the process, is generated. The composite automaton is tailored to the merchant's goal, according to one embodiment, and provides a model of the process based on the merchant's goal, according to one embodiment. The composite automaton is generated based on a subset of all of the attributes and services that are associated with the original version of the process, according to one embodiment. The subset may include any where from one to all of the attributes and services of the original version of the process. The subset is selected from the original version's attributes and services based on the merchant's goal, according to one embodiment. Therefore, the composite automaton is capable of being integrated into the merchant's system, according to various embodiments. Generating the new version of the process based on the merchant's goal is also referred to as "synthesizing the process."

Although various embodiments are described in the context of generating a new version of the process, embodiments are also well suited for generating a non-deterministic model of the process that is not a new version. The phrase "non-deterministic model of the process" shall be used to refer to a non-deterministic model of a new version of the process as well as a non-deterministic model of the process that is not a new version.

Although, according to one embodiment, the composite automaton is uncontrolled, the composite automaton is controllable, for example, using a supervisor. The uncontrolled but controllable composite automaton is also referred to as a model of the new version of the process. The supervisor can then be used to control execution of the model according to the business goal. Therefore, According to various embodiments, the composite automaton is also referred to as an "uncontrolled process" and the composite automaton in combination with the supervisor is referred to as a "controlled process."

Various embodiments shall be described in the context of Google Checkout Service (GCS). However embodiments are well suited to other types of business processes such as a map navigation business process. As discussed herein, artifacts and services of Google Checkout as described in an online developer's guide are discussed. There are numerous ways to model Google Checkout using an artifact model. The illustrations are used to demonstrate the applicability of control theory using a real business process synthesis example. For the sake of providing a clear illustration, certain technical details are omitted and a simplified model is described.

Although various embodiments are described in the context of a business process and business goals, embodiments are well suited to a process and a goal. The process may be complex or simple. An example of a complex process is Google Checkout. Examples of a simple process include, but are not limited to calculating prices for the US postal service or calculating a zip code.

First an overview of a system for automatically synthesizing a process from an artifact system shall be discussed. Second, the theory of the system shall be discussed. Third, the system shall be discussed in the context of a specific business process called Google Checkout. Fourth, a method of generating a non-deterministic model of an artifact system for a received goal shall be discussed.

System Overview

Figure 1:
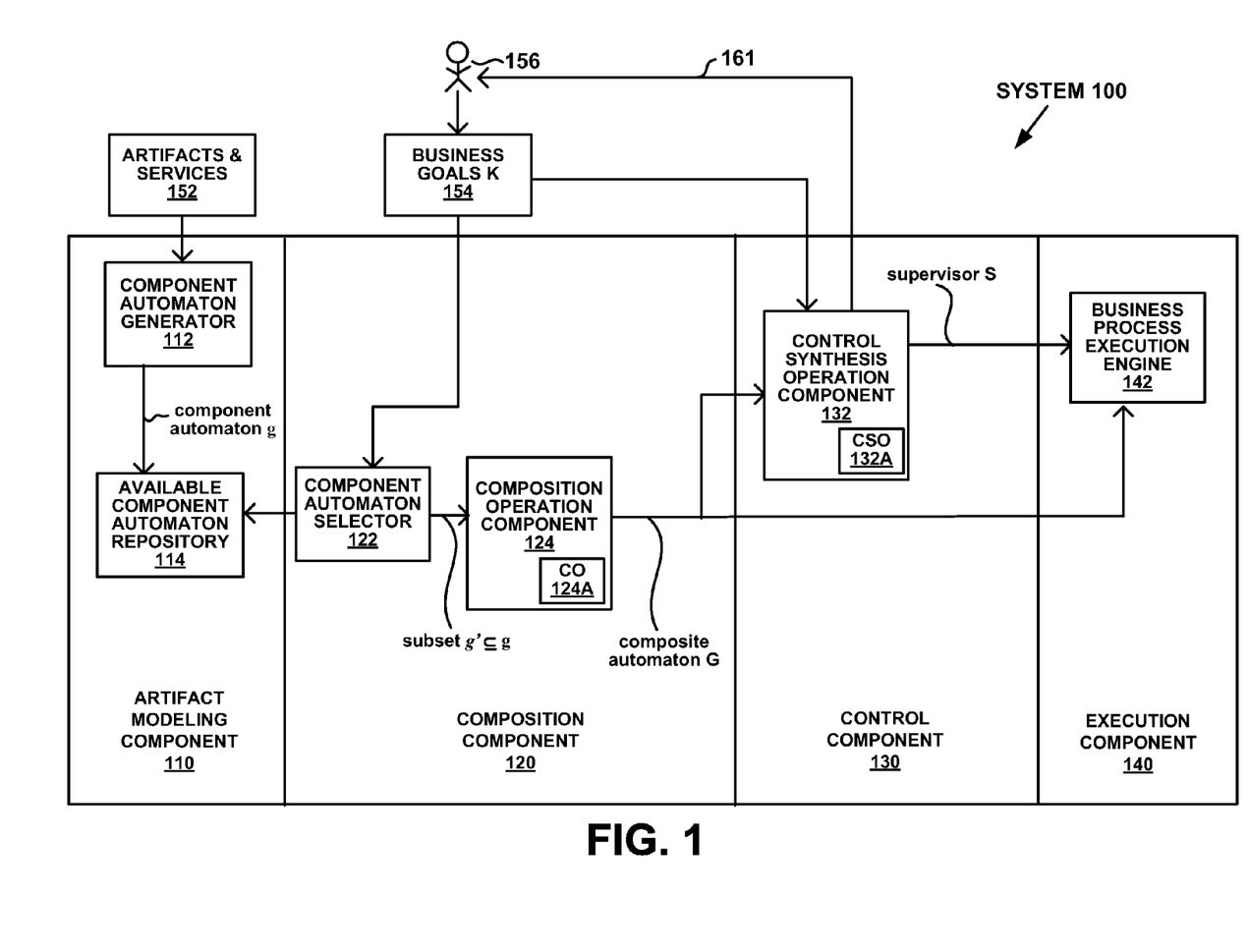
FIG. 1 depicts a block diagram of a system for automatically synthesizing a process from an artifact system, according to one embodiment.

FIG. 1 depicts a block diagram of a system 100 for automatically synthesizing a process from an artifact system, according to one embodiment. The blocks that represent features in FIG. 1 can be arranged differently than as illustrated, and can implement additional or fewer features than what are described herein. Further, the features represented by the blocks in FIG. 1 can be combined in various ways. The system 100 can be implemented using hardware, hardware and software, hardware and firmware, or a combination thereof.

As depicted in FIG. 1, the system 100 includes an artifact modeling component 110, a composition component 120, a control component 130, and an execution component 140.

The artifact modeling component 110 includes a component automaton generator 112 and an available component automaton repository 114. The composition component 120 includes a component automaton selector 122 and a composition operation component 124. The composition operation component 124 performs a composition operator 124A. The control component 130 includes a control synthesis operation component 132. The control synthesis operation component 132 performs a control synthesis operator 132A. The execution component 140 includes a business process execution engine 142.

The artifact modeling component 110 receives artifacts and services 152, according to one embodiment, for the purpose of synthesizing one or more business processes. Artifacts, according to one embodiment, are business objects described as data classes. An artifact consists of a plurality of attributes. Attributes may be simple variables, such as Booleans, strings, etc, or may be more complex variables such as references to other artifacts. Tables 1, 2 and 3 depict examples of artifacts and services 152, according to various embodiments. For example, Table 1 depicts examples of artifacts and Table 2 depicts examples of services.

Referring to the modeling component 110 of FIG. 1, artifacts from the XML schema are derived. The system 100 can be automated, according to one embodiment, if each XML element is treated as an artifact, and its XML attributes naturally become the attributes of the artifact. However, for the sake of illustration, some of these XML elements are aggregated and only high-level artifacts are described herein. Table 1 depicts a top level artifact class order and an incomplete set of its attributes. Some of these attributes are of primitive types, such as string and enum, while others are artifact class types. Details of three of these second level artifact classes are displayed in Table 1 as well.

Each API is considered as a service in the artifact model. Its precondition and effects are logical formulae in the form described in Definition 3, according to one embodiment, as will become more evident. These formulae can be derived from the online document provided by the company that provides the original version of the business process. There are roughly two categories of APIs in this illustration, information calculation and order state manipulation, according to one embodiment. Information calculation APIs can change the status of certain attributes from undefined to defined. Table 2 shows two examples. "financialOrder" is an example of an artifact. "financialOrder State" and "fulfillment State" are examples of attributes of the "financialOrder" artifact.

TABLE 1

| Class Order |
|---|
| GoogleOrderNumber: String
shoppingCart:ShoppingCart
merchantCalc: MerchantCalc
orderAdjustment: OrderAdjustment
riskInformation: RiskInformation
financialOrderState: enum
fulfillmentOrderState: enum |
| Class MerchantCalc |
| URL: String
acceptCoupon: bool
acceptGiftCertificate: bool |
| Class OrderAdjustment |
| adjustmentTotal: double
merchantCalcSuccess: bool |
| Class RiskInformation |
| avsResponse: enum
billingAddress: Address
buyerAccountAge: int
cvnResponse: enum
eligibleForProtection: bool
ipAddress: String
partialCCNumber: String |

TABLE 2

Service CheckoutShoppingCart
Access: {x: Order}
PRE: ¬DEF(x.shoppingCart) ^
    ¬DEF(x.merchantCAlc)
Effects:
    new(x.shoppingCart)
    new(x.shoppingCart)
    new(x.merchantCalc)
Service NewOrderNotification
Access: (x: Order)
PRE: ¬DEF(x.GoogleOrderNumber)

TABLE 2-continued

Effects:
   DEF(x.GoogleOrderNumber)^
   x.financialOrderState = reviewing^
   x.fulfillmentOrderState = new Order state manipulation APIs issued by the merchant are displayed in Table 3. These APIs affect the financialOrderState attribute and the fullfillmentOrderState attribute, and are abbreviated as fiState and ffState in the table, respectively. Table 3 can be derived form the "Financial Order States" and "Fulfillment Order States" tables provided by online documentation.

TABLE 3

| Service | Precondition | Effects |
|---|---|---|
| AuthorizeOrder | x.fiState = chargeable | x.fiState = chargeable<br>x.fiState = payment_declined |
| ChargeAndShipOrder | x.fiState = chargeable | x.fiState = charged<br>x.fiState = payment_declined |
| RefundOrder | x.fiState = charged | |
| CancelOrder | x.fiState = chargeable∨<br>x.fiState = payment_declined | x.fiState = cancelled^<br>x.ffState = will_not_deliver |
| ProcessOrder | x.ffState = new | x.ffState = processing |
| DeliverOrder | x.ffState = new∨<br>x.ffState = processing | s.ffState = delivered |

The artifacts and services 152 may be provided by a merchant or by a business process developer among other things. The artifacts and services 152 may be for the synthesis of one business process or many different business processes. The business processes may be associated with one company or many companies.

The component automaton generator 112 receives the artifacts and services 152 and generates component automata. According to one embodiment, a component automaton is generated for each attribute of artifacts. Each of the attributes may be represented by a separate component automaton. A component automaton, according to one embodiment, is a state transition machine where the states represent the potential values for an attribute and the transitions between the states are services that cause the attribute to change from one value to another value.

Figure 2:
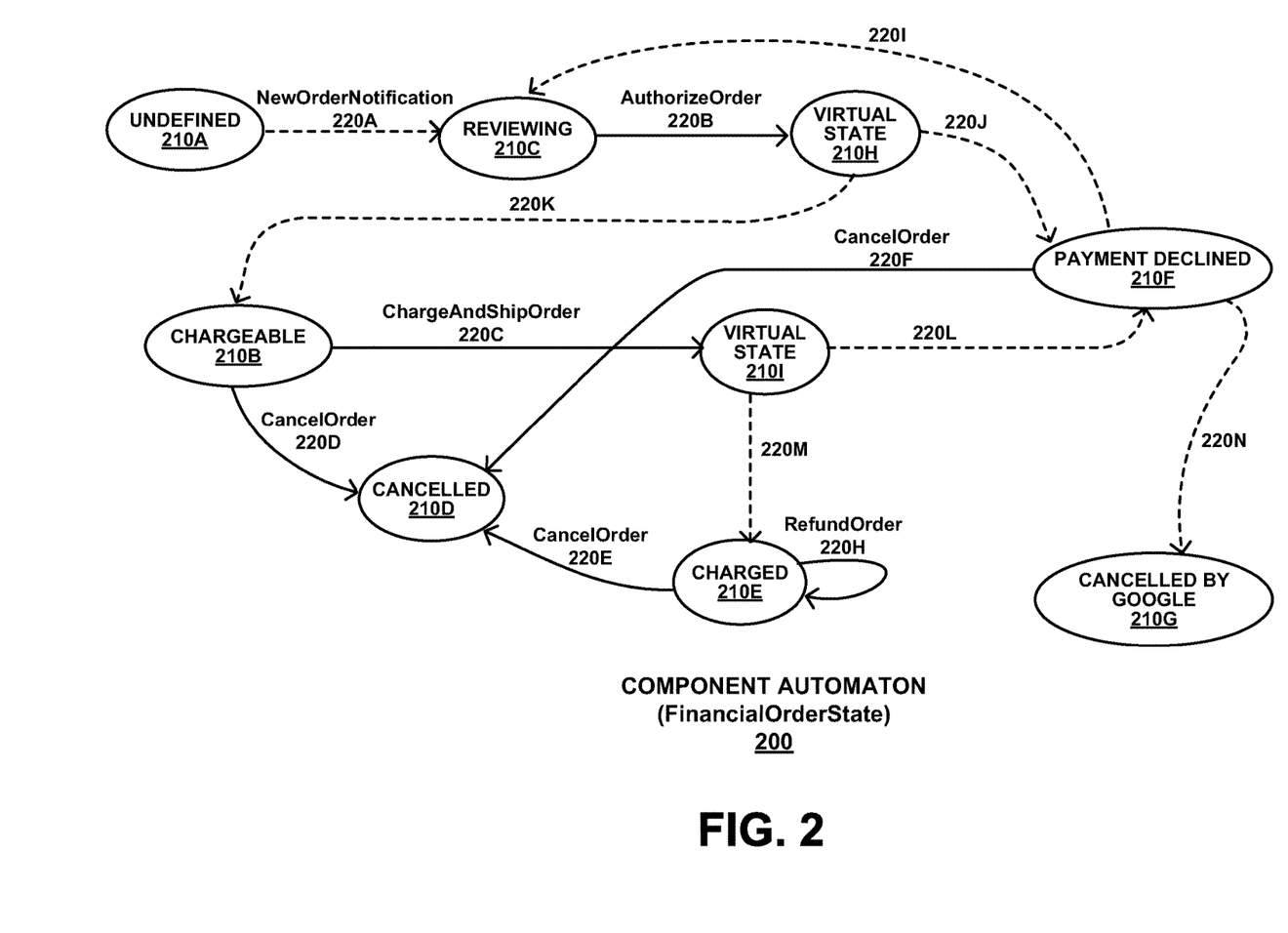
FIG. 2 depicts a component automaton for the financialOrderState attribute, according to one embodiment.

For example, FIG. 2 depicts a component automaton 200 for the financialOrderState attribute, according to one embodiment. The states 210 include undefined 210A, reviewing 210C, cancelled_by_google 210G, payment_declined 210F, chargeable 210B, cancelled 210D, charged 210E and two virtual states 210H, 210I. The transitions 220 include NewOrderNotification 220A, AuthorizeOrder 220B, ChargeAndShipOrder 220C, CancelOrder 220D, 220E, 220F, and RefundOrder 220H. NewOrderNotification 220A transitions from undefined 210A to reviewing 210C. AuthorizeOrder 220B transitions from reviewing 210C to virtual state 210H. There are three CancelOrder 220F, 220D, 220E that respectively transition from payment_declined 220F to cancelled 210D, from chargeable 210B to cancelled 210D, and from cancelled 210D to charged 210E. ChargeAndShipOrder 220C transitions from chargeable 210B to virtual state 210I. RefundOrder 220H transitions from charged 210E back to charged 210E. For the purposes of illustration, the transitions 220 depicted in FIG. 2 represent APIs that are documented for Google Checkout Service's. The transitions 220, according to one embodiment, are APIs that can be invoked by a merchant. According to one embodiment, transitions that a merchant cannot control are either internal transitions that Google enforces or are transitions that are controlled by a user, as will become more evident.

As depicted in FIG. 2, the dashed lines represent transitions 220I, 220J, 220K, 220L, 220M, 220N that the merchant cannot control and the solid lines 220B, 220C, 220F, 220D, 220E, 220H represent transitions that can be controlled by the merchant, according to one embodiment. For example, the respective transitions 220I, 220J, 220K, 220L, 220M, 220N from payment_declined 210F to reviewing 210C, from virtual state 210H to payment declined 210F, from virtual state 210H to charged 210E, from virtual state 210I to payment declined 210F, from virtual state 210I to charged 210E, from payment_declined 210F to cancelled_by_google 210G are uncontrollable. The transitions 220B, 220C, 220D, 220E, 220H from reviewing 210C to virtual state 210H, from chargeable 210B to virtual state 210I, from chargeable 210B to cancelled 210D, from charged 210E to cancelled 210D, and from charged 210E back to charged 210E are controllable.

The component automaton 200 depicted in FIG. 2 is just one example of a component automaton. Another example of a component automaton is an automaton for an attribute, such as FullfillmentOrderState. According to one embodiment, component automata for FinancialOrderState and FullfillmentOrderState can be used to synthesize a business process with a merchant's system.

The generated component automata set g is stored in a repository 114 of available component automata. For example, the repository 114 can include component automata for FinancialOrderState and FullfillmentOrderState for the original version of Google Checkout as well as other component automata for the original version of Google Checkout and other original versions of other business processes.

According to one embodiment, the component automaton generator 112 is implemented using the Web2Exchange platform. The Common Information Model (CIM) based annotation system 100 in Web2Exchange facilitates the use of precondition/effect descriptions.

The composition component 120 includes an automaton selector 122 and a composition operation component 124. The composition component 120 receives a business goal K 154. The business goal K 154 is also referred to as original specification K. According to one embodiment, it is a regular language.

Table 4 depicts an example of a business goal K 154 for the Google Checkout example.

Goal state FinancialOrderState = charged
Fulfillment order state = delivered

The component automaton selector 122 uses the business goal K 154 to select a subset of component automata g' from the available component automata g in the repository 114. For example, the component automaton selector 122 can use the business goal K 154 to select the component automata for the FinancialOrderState and the FullfillmentOrderState from the repository 114, which may be a subset g' of all of the available component automata in the repository 114. The subset of component automata g' may include one or more of the available component automata g. The subset of component automata g' may include all of the available component automata g.

The composition operation component 124 receives the subset g' and generates a composite automaton G, which includes the component automata in the subset g'. According to one embodiment, the composite automaton G is a model of a new version of the business process to be refined by the control component 130, which in this illustration is Google Checkout.

According to one embodiment, by itself the model, which according to one embodiment is a composite automaton G, is uncontrolled and non-deterministic and includes possible behaviors for the associated artifacts but does not provide control to guide execution toward the business goal K. For example, referring to Google Checkout illustration, the actions of a human or an outside system are not controllable. A person could press cancel resulting in a cancel/order transition. In another example, the charge could fail, or there may not be enough line of credit resulting in a cancel/order transition.

According to one embodiment, control can be applied to the composite automaton G. For example, the control component 130 provides a control synthesis operation component 132 that receives the business goal K 154 and the composite automaton G and generates a supervisor S based on the business goal K 154 and the composite automaton G. The sublanguage $K^{\uparrow C}$, according to one embodiment, is a supremely controllable non-blocking sublanguage $K^{\uparrow C}$ of the original specification K. The sublanguage $K^{\uparrow C}$, according to one embodiment, is generated, at least in part, based on the original specification K. According to one embodiment, the sublanguage $K^{\uparrow C}$ provides a representation of the supervisor S.

According to one embodiment, the supervisor S includes state transition pairs that specify whether the transitions of the pairs can be executed for respective states. For example, referring to FIG. 2, the supervisor S may include a state transition pair such as disable cancelOrder 220E for changed 210E indicating that the cancelOrder method should not be allowed when in the charged state 210E. The state transition pairs of the supervisor S can be used to control the execution of the composite automaton G, as will become more evident.

According to one embodiment, illegal states are removed and dead paths are trimmed from the composite automaton G to create the supervisor S using control series, as will become more evident.

According to one embodiment, the composite automaton G may or may not be controllable with respect to the business goal K 154. If the composite automaton G is controllable with respect to the business goal K 154, the control synthesis operation component 132 can be used to provide a supervisor S, and it guarantees successful termination, according to one embodiment. If the composite automaton G is not controllable with respect to the business goal K 154, then, according to one embodiment, a supervisor S is not generated.

Since, according to one embodiment, a supervisor S is generated if the composite automaton G is controllable and does not generate a supervisor S if the composite automaton G is not controllable, according to various embodiments, the system 100 (FIG. 1) can be used to analyze the soundness of the existing artifact system as reflected by the component automata g and complete the rule set as specified by the business goal K 154 with additional rules as specified by the supervisor S.

In the event that the composite automaton G is not controllable with respect to the business goals K 154, the control synthesis will fail and will not output the supervisor S, according to one embodiment. In this case, the system 100 can provide at 161 output for a human 156, associated with the merchant, to read. The human 156 can input additional business goals K 154 and another iteration of the composition component 120 and control component 130 can be performed based on the additional business goals K 154.

The execution component 140 provides a business process execution engine 142. According to one embodiment, the business process execution engine 142 automatically executes the business process by controlling execution of the composite automaton G, which is a non-deterministic model according to one embodiment, based on the supervisor S. The execution engine 142 can use the state transition pairs of the supervisor S to control the execution of the composite automaton G. The execution engine 142 can enforce the state transition pairs through an observe-act feedback cycle. For example, if the supervisor S includes a state transition pair that indicates the ChargeAndShipOrder service 220C can be executed when in the chargeable state 210B, then the execution engine 142 will execute the ChargeAndShipOrder service 220C when execution is in the chargeable state 210B, according to one embodiment. In another example, if the supervisor S includes a state transition pair that indicates the CancelOrder service 220E should not be executed when in the charged state 210E, the execution engine 142 will not execute the CancelOrder service 220E when in the charged state 210E, according to one embodiment.

The business goal K and the supervisor S may be language based or state based, among other things.

According to one embodiment, attributes and services of an original version of a process, such as Google Checkout Services (GCS), is received. G, according to one embodiment, is a new version of a process that has been tailored to the merchant's goals K. In one embodiment, G is a composite automaton. G provides a model of the new version of the process based on the merchant's goal K, according to one embodiment. G is generated based on a subset g' of all of the attributes and services g that are associated with the original version of the process, according to one embodiment. The subset g' may include any where from one to all of the attributes and services g. The subset g' is selected from the attributes and services g based on the merchant's goal K. Therefore, G is capable of being integrated into the merchant's system. Generating the new version of the process based on the merchant's goal K is also referred to as "synthesizing the process."

Although, according to one embodiment, the composite automaton G is uncontrolled, the composite automaton G is controllable, for example, using a supervisor S. Therefore, according to various embodiments, the composite automaton G is also referred to as an "uncontrolled process" and the composite automaton G in combination with supervisor S is referred to as a "controlled process."

Although various embodiments are described in the context of generating a composite automaton G for a single process, such as Google Checkout Services (GCS), embodiments are well suited for generating a composite automaton G for a plurality of processes.

Although various embodiments are described in the context of a single business goal K, embodiments are well suited to generating a composite automaton G based on a plurality of business goals K.

The following provides more details on the theory associated with each of the components 110, 120, 130, 140 and more details on for an implementation pertaining to Google Checkout (GCS) for each of the components 110, 120, 130, 140.

Theory

The following provides a description of the theory behind the artifact modeling component 110, according to various embodiments. According to one embodiment, an artifact-centric model is provided. According to one embodiment, states are not included in artifact definitions as the standard artifact definition requires. Instead, enum type attributes are used to capture states. This allows multiple state variables described by enum attributes in one artifact. In accordance with this simplification, attribute value checking and value assignment in preconditions and effects are allowed. According to one embodiment, business goal K 154 does not change the value of attributes. According to one embodiment, the read and write sets are aggregated into one access set for services.

A type system, according to one embodiment, consists of primitive types $T_p$ that includes the enumeration type, and C of artifact class types. A type is an element in the union $T=T_p \cup C$, and the domain of each type t element T is DOM(t), according to one embodiment. A represents an attribute set and IDc represents the identifier for each class $C \in C$.

Definitions 1-7, as described herein, can be used as a part of various embodiments.

Definition 1: An artifact class is a tuple $(C, A, \tau)$ where $C \in C$ is a class type, $A \subseteq A$ is a finite set of attributes, $\tau: A \to T$ is a total mapping. An artifact object of class $(C, A, \tau)$ is a pair (o, u) where o element IDC is an identifier and u is a partial mapping that assigns each attribute $A \in A$ an element in its domain $DOM(\tau(A))$.

An attribute A of an artifact object x is referenced as x.A.

Definition 2: A schema is a finite set $\Gamma$ of artifact classes with distinct names such that every class referenced in $\Gamma$ also occurs in $\Gamma$.

The set of terms over a schema $\Gamma$ is defined to be: i) objects of classes in $\Gamma$, and ii) x.A where x is a term and A is an attribute.

Definition 3: An atom over a schema $\Gamma$ is one of the following:
1. t1=t2, where t1, t2 are terms in $\Gamma$,
2. DEF(t,A), where t is a term in $\Gamma$ and A an attribute,
3. NEW(t.A), where t is a term in $\Gamma$ and A an attribute typed attribute, and
4. t.A=val, where val element DOM(t(t,A)) is a value for the term t.A.

A condition over $\Gamma$ is a conjunction of atoms and negated atoms, whereas an effect is a set of conditions that describe different conditional outcomes, according to one embodiment.

Definition 4: A service s over a schema $\Gamma$ is a tuple (n, V, P, E) where n is the service name, V is the finite set of variables of classes in $\Gamma$, P is a condition over $\Gamma$ that does not contain the atom NEW and E is the effect, according to one embodiment.

Various semantics exist for the precondition/effect service model. For the sake of illustration, simplified semantics are used instead of the complete OWL'S standard.

Definition 5: An artifact system is a triple $(\Gamma, S, R)$, where $\Gamma$ is a schema, S is a set of services over $\Gamma$, and R is a set of business rules. A business rule is a pair of a condition and a service over $\Gamma$. The service is invoked if the condition is true, according to one embodiment.

The following provides a definition of automaton, according to various embodiments. While a composite automaton G can model a new version of a business process that is to be controlled, according to one embodiment, the definition of automaton can be applied to any automaton, for example, in a repository 114.

According to one embodiment, a new version of the business process that is to be controlled is modeled as a composite automaton $G=(X, E, f, x_o, X_m)$, where X is the set of states, E is the set of event labels, partial function $f: X \times E \to X$ is the transition function, xo is the initial state, and $X_m$ is the set of terminal states, according to one embodiment. L(G) represents the regular language generated by the composite automaton G, and $L_m(G)$ represents the language marked by G; name, $L_m(G)$ consists of those strings in L(G) that end at a state in $X_m$.

According to one embodiment, a string is a path in a state machine, such as the state machine for the component automaton 200 depicted in FIG. 2. Event set E is partitioned into controllable and uncontrollable events $E=Ec \cup Euc$. Controllable events can be prevented or postponed at execution time, but uncontrollable events are not postponed, according to one embodiment. Examples of controllable events include charging a credit card. On the other hand, the outcome of the charging action can be modeled as uncontrollable events, such as a successful charge or an invalid card number.

Either of two automaton composition operations can be used by the composition operation component 124, according to various embodiments. For example, the composition operation component 124 can use the parallel composition operation, among others, as discussed in the context of definition 7, among other places. According to one embodiment, control synthesis 132 uses product operation, among others, as discussed in the context of definition 6.

Definition 6: The product of automata $G_1=(X_1, E_1, f_1, x_{01}, X_{m1})$ and $G_2=(X_2, E_2, f_2, x_{02}, X_{m2})$ is an automaton $G_1 \times G_2 := (X_1 \times X_2, E_1 \cap E_1, f, (x_{01}, x_{02}), X_{m1} \times X_{m2})$, according to one embodiment $$f(x1, x2), e := \begin{cases} (f1(x1, e), f2(x2, e)) & \text{if both are defined} \\ \text{undefined} & \text{otherwise} \end{cases}$$

where $L(G_1 \times G_2)=L(G_1) \cap L(G_2)$ and $L_m(G_1 \times G_2)=L_m(G_1) \cap L_m(G_2)$, according to one embodiment.

Definition 7: Parallel composition of automaton $G_1$ and $G_2$ is an automaton $G_1 \| G_2 := (X_1 \times X_2, E_1 \cup E_2, f, (x_{01}, x_{02}), X_{m1} \times X_{m2})$, according to one embodiment $$f(x1, x2), e := \begin{cases} (f1(x1, e), x2) & \text{if } f1(x1, e) \text{ is defined and } e \notin E2 \\ x1, f2(x2, e)) & \text{if } f2(x2, e) \text{ is defined and } e \notin E1 \\ f1(x2, e), f2(x2, e)) & \text{if both are defined} \\ \text{undefined} & \text{otherwise} \end{cases}$$

The above definitions can extend to more than two automata in a natural way, according to various embodiments.

The following provides a description of the theory behind the control component 130, according to various embodiments. Supervisory control theory (SCT) is a branch of Discrete Event Systems (DES) control theory that deals with systems modeled as finite state automata and control specifications expressed as regular languages.

A supervisor S of the composite automaton G is a function $S: L(G) \to 2^E$, i.e., S maps a string in the regular language L(G) to a set of events to be disabled, according to one embodiment These events can be defined by f and do not include any uncontrollable events, according to various embodiments. Following the control logic of the supervisor S, provides a sublanguage L(S/G) of L(G), according to one embodiment. S/G represents the controlled system, according to one embodiment, that is executed by the execution engine 142. The set of marked strings that survive in the controlled system is $L(S/G) \cap L_m(G)$ and it is denoted by $L_m(S/G)$, which shall be referred to herein as the controlled system marked up language $L_m(S/G)$.

According to various embodiments, the control specification K is a regular language subset $L_m(G)$ over the event set E. The control component 130, according to one embodiment, generates a supervisor S such that $L_m(S/G)=K$ and $L(S/G)=\overline{K}$, where the over bar notation denotes the operation of prefix-closure over strings. This means that all strings of K are achieved under control and that all strings in the controlled behavior can be extended to a string in K, according to one embodiment. The latter condition is called a non-blocking condition. Subject to the technical condition that $K=\overline{K} \cap L_m(G)$, condition 1 depicted below is the condition for the existence of the supervisor S in the presence of uncontrollable events, according to one embodiment:

$$\overline{K}E_{uc} \cap L(G) \subseteq \overline{K} \quad \text{Condition 1}$$

Condition 1 means, according to one embodiment, that if a string is allowed by both the composite automaton G and the business goal K, any extension by uncontrollable events that are defined in the composite automaton G will be included in the business goal K, because uncontrollable events are not blocked, according to one embodiment. The business goal K is considered to be controllable if condition 1 is satisfied, according to one embodiment.

If the business goal K is controllable, the supervisor S is constructed, according to one embodiment, as $\forall \sigma \in L(G)$, $S(\sigma)=(e|e \in E, \sigma e \in L(G)/\overline{K})$. If the business goal K is not controllable, the maximal subset of K is determined such that condition 1 is satisfied, according to one embodiment. It can be shown that the maximal subset is unique and computable. It is called the supremely controllable non-blocking sublanguage $K^{\uparrow C}$ of the business goal K. This sublanguage $K^{\uparrow C}$ has four key properties, according to various embodiments: (i) it satisfies condition 1 by construction and, therefore, this sublanguage $K^{\uparrow C}$ is achievable under control by its corresponding supervisor S. ii) this sublanguage $K^{\uparrow C}$ does not prevent successful termination and, therefore, it is non-blocking, (iii) it is maximally permissive, disabling transitions only when necessary to satisfy the control specification K. (iv) it is a regular language.

Figure 3:
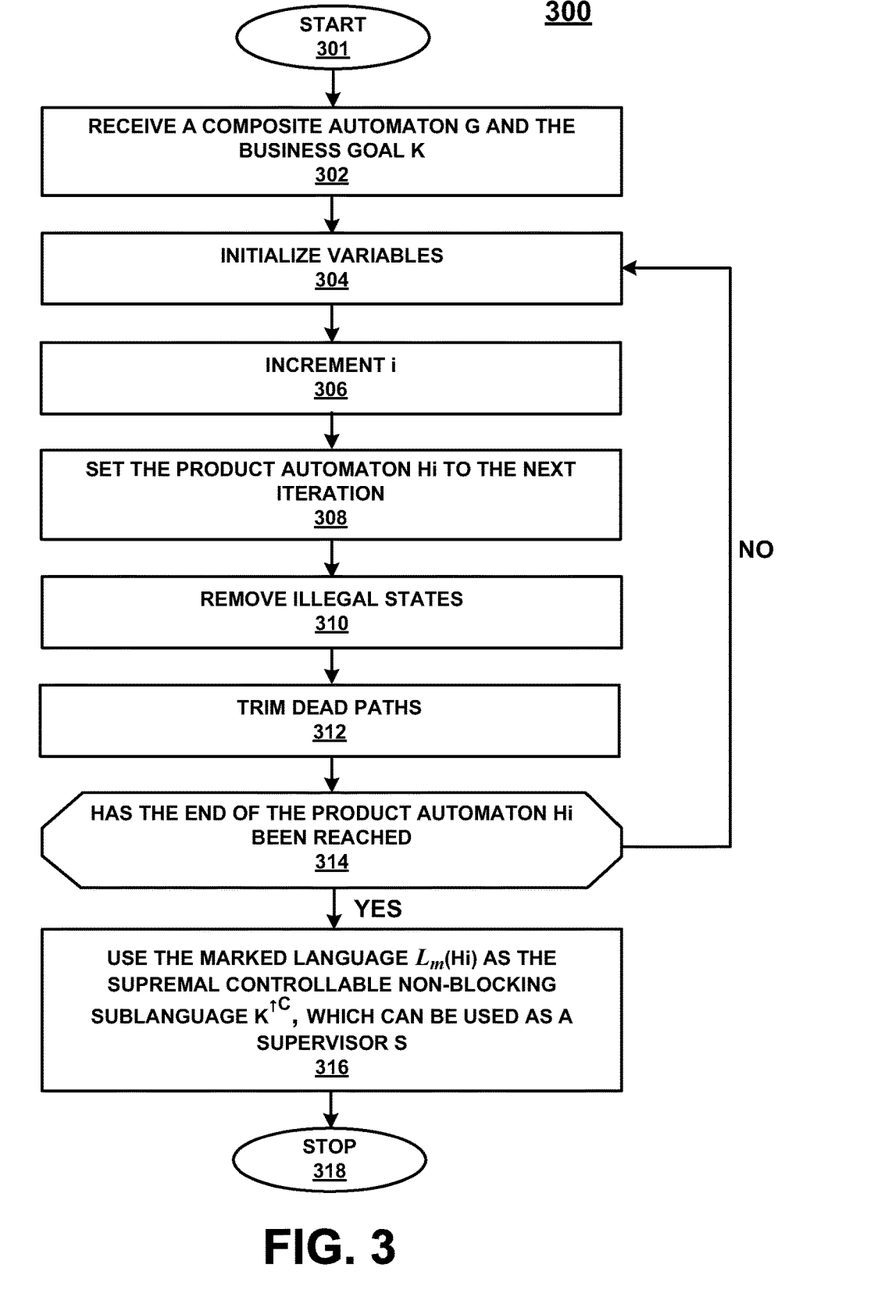
FIG. 3 depicts a flow chart for the control synthesis operator, according to one embodiment.

Next an algorithm that computes sublanguage $K^{\uparrow C}$, according to one embodiment, is described. FIG. 3 depicts a flow chart for the control synthesis operator 132A, according to one embodiment.

At 301, the method begins.

At 302, a composite automaton G and a business goal K are received. According to one embodiment, the business goal K is an automaton that is represented as H. H shall also be referred to as the business goal automaton H. According to one embodiment, the business goal K is a regular language.

At 304, variables are initialized. For example in this illustration, Hi is used to iterate through the states that are the result of performing a product operator, for example, as defined by definition 6, on the business goal automaton H and the composite automaton G. The Hi for each iteration of the loop formed by 304-314 shall be referred to as a product automaton. The composition operator is a product composition operator in this illustration. The product automaton $H_0$ for composite automaton G and control specification K represented by automaton H, where $L(H)=\overline{K}$ and $L_m(H)=K$. The product composition operator allows mapping of states of H to those of G. In this illustration, a product composition operator is used to set $H_0$ to the initial product of the business goal automaton H and the composite automaton G. For example, let $H_0:=(Y_0, E, h_0, (y_0, x_0), (Y_m \times X_m))=H \times G$, where $Y_0 \subseteq Y \times X$, according to one embodiment.

The following iterative part of the method, as illustrated with the loop formed by 306-314, prunes the product automaton $H_0$ until it is both controllable and non-blocking, according to one embodiment.

Further the variable i is set to 0.

At 306, i is incremented. For example, i=i+1.

At s308, Hi is set to the next iteration of the product of the business goal automaton H and the composite automaton G. For example, $H_i$ is set equal to $(Y_i, E, h_i, (y_0, x_0), (Y_m \times X_m))=H_{i-1}$.

At 310, illegal states are removed. For example, every state $(y,x) \in Y_i$ is removed, according to one embodiment, where f(x,e) is defined for some $e \in E_{uc}$ but $h_i((y,x),e)$ is not define.

At 312, dead paths are trimmed. For example, dead paths of $H_i$ are removed, according to one embodiment, such that a prefixed closed $L(H_i)$=a prefixed closed $L_m(H_i)$.

At 314, a determination is made as to whether the end of the product automaton $H_i$ has been reached. For example, determine if $H_i=H_{i-1}$.

If the end of the product automaton H, has been reached as indicated by $H_i=H_{i-1}$, then method proceeds to 316. Otherwise, the method proceeds to 306 for another iteration.

At 316, the marked language $L_m(Hi)$ is used as the supremely controllable non-blocking sublanguage $K^{\uparrow C}$, which can be used as a supervisor S.

At 318, the method ends.

The control synthesis algorithm, as illustrated with flowchart 300, is an iterative method, according to one embodiment.

Controllability, as stated in condition 1, is satisfied at 310, according to one embodiment. If some uncontrollable transition is present in the composite automaton G but it is not permitted by the business goal K, the corresponding state in the product automaton H is removed, since, according to one embodiment, it is not prevented from occurring and, therefore, violating the business goal K. Once these states are removed in 310, some other states in the product automaton H may no longer reach any terminal state. Therefore, the product automaton H is trimmed in 312, according to one embodiment. Similarly, trimming the automaton can remove uncontrollable transitions in the product automaton H and violate the controllability condition 1, hence, iteration is performed between 306-314, according to one embodiment. Note that FIG. 3 may output an empty language if there are too many uncontrollable transitions or if the business goals K are too restrictive.

The following is an illustration of the flowchart 300, according to various embodiments, which is described in the context of FIG. 2. In the first iteration, cancelled_by_google 210G is removed in step 312. In the second iteration, payment_declined 210F is removed in step 310. In the third iteration, the two virtual states 210H, 210I are removed in step 310 and charged state 210E is removed in step 312. In this illustration, according to various embodiments, the method continues until all of the states 210 are removed resulting in an empty specification $K^{\uparrow C}$.

According to one embodiment, the pathological paths where the business goals K are violated are provided. For example, a report of the pathological paths can be printed for an employee 156 (FIG. 1) of the merchant to read. According to one embodiment, a supervisor S provides for maximally permitted behavior. According to another embodiment, a supervisor S provides for minimally desired behavior. For example, instead of describing the entire order processing system and capturing all corner cases, the supervisor S can specify only rules to be enforced, such as a returned order must be refunded.

Control synthesis can be provided in time quadratic in the size of G×K in the worst case, according to one embodiment. However, control synthesis in practice usually converges in a few iterations. In addition, control synthesis can be performed offline operation, and, therefore, would not increase execution time. Finally, the original version of many business processes are typically small, a few dozens of tasks at most. Experimental results have shown that automaton models and the control synthesis algorithm scale to real-world business processes.

If the merchant provides an incomplete set of business goals K, the system 100 can be used to complete the business goals K, for example, by providing output to a person 156, associated with a merchant, at 161. The person 156 can provide additional business goals K 154 for the composition component 120 and another iteration of the composition component 120 and control component 130 can be performed based on these additional business goals K 154.

Google Checkout Service Example

Various embodiments shall be described in the context of Google Checkout Service (GCS). As discussed herein, artifacts and services of Google Checkout as described in an online developer's guide are discussed. There are numerous ways to model a service using an artifact model. The illustrations are used to demonstrate the applicability of control theory using a real business process synthesis example. For the sake of providing a clear illustration, certain technical details are omitted and a simplified model is described.

Google Checkout is an online payment processing service that helps merchants manage their sales orders. It has around 30 RESTful style application programming interfaces (APIs) that communicate between Google and the merchant through HTTP PUT and GET commands. The parameters of each API can be sent through name value pairs in the HTTP request, or in a separate XML message. These APIs are designed with extreme flexibility such that merchants of various sizes and complexity can use the same service. The simplest case could be a lump sum payment, while the complicated case includes a fully customizable calculation system for shipping, tax, coupon, and gift certificate, and handles a complete range of operations such as credit authorization, declined payment, back order, shipping, return and refund. This flexibility results in an inflated set of APIs and an utterly complicated system. As a result, there is a steep learning curve on using these APIs. Google estimates up to four weeks to integrate GCS with a merchant's shopping portal. Maintenance is even more difficult as both the merchant's order processing system and GCS are evolving. To illustrate various embodiments, GCS is modeled as an artifact system but with an incomplete set of business rules that could be reflected in the component automata g. The rules reflected by the component automata g capture only Google's behavior, according to their specification document. DES control theory is then used, according to one embodiment, to automatically synthesize the merchant's business goals K to complete the integration of a new version of the business process into the merchant's system.

Referring to the modeling component 110 of FIG. 1, artifacts from the XML schema are derived. The system 100 can be automated if each XML element is treated as an artifact, and its XML attributes naturally become the attributes of the artifact. However, for the sake of illustration, some of these XML elements are aggregated and only high-level artifacts are described herein. Table 1 depicts a top level artifact class order and an incomplete set of its attributes. Some of these attributes are of primitive types like string and enum, the others are artifact class types. Details of three of these second level artifact classes are displayed in Table 1 as well.

Each API is considered as a service in the artifact model. Its precondition and effects are logical formulae in the form described in Definition 3, according to one embodiment. These formulae can be derived from the online document provided by the company that provides the original version of the business process. There are roughly two categories of APIs in this illustration, information calculation and order state manipulation, according to one embodiment. Information calculation APIs change the status of certain attributes from undefined to defined. Table 2 shows two examples.

Order state manipulation APIs issued by the merchant are displayed in Table 3. These APIs affect the financialOrderState attribute and the fullfillmentOrderState attribute, and are abbreviated as fiState and ffState in the table, respectively. Table 3 can be derived form the "Financial Order States" and "Fulfillment Order States" tables provided by online documentation.

The following describes a checkout process in the context of Google Checkout, according to one embodiment. When the online shopping customer clicks the checkout button, the merchant calls CheckoutShoppingCart and redirects the customer to the GCS page. If the merchant optionally defines the MerchantCalc artifact, Google responds with the MerchantCalculationCallback API immediately. After collecting customer information and optionally the merchant-specified tax and shipping cost, Google calls NewOrderNotification and RiskInformationNotification. The merchant can either charge and ship the order or cancel the order. The merchant can also cancel the order after a charge failure. If the customer rejects or returns shipping, the merchant can cancel the order after issuing a refund. Therefore, according to one embodiment, services in the artifact model are invoked by either Google or the merchant. Google specifies when to invoke its commands, which can be captured as business rules in the artifact model as reflected by the component automata g associated with Google Checkout. Table 4 shows two examples. The merchant defines its own business goals K for its APIs, in order to complete the integration, according to one embodiment. According to one embodiment, DES control theory is used as a part of automatically synthesizing business process rules as reflected by the component automata g with the merchant's business goals K.

TABLE 4 if DEF(x.merchantCalc) invoke MerchantCalculationCallback
if x.financialOrderState=reviewing invoke RiskInformationNotification The following provides a description of the modeling component 110 (FIG. 1) in the context of Google Checkout, according to various embodiments. Each attribute that appears in the precondition or effect of some service is modeled by the component automaton generator 112 as a component automata g, according to one embodiment. States of a component automata g represents possible values of the attribute, while transitions are services. An attribute may have an infinite number of values. According to one embodiment, it is sufficient to represent the attributes that appear in the preconditions and effects. For example, in GCS, most attributes such as GoogleOrderNumber have only two states, defined or undefined. Numerical types with mathematical operations can be discretized using interval arithmetic. Artifact class typed attributes can refer to any artifact instances of the same type, but typically there are a fixed number of artifact instances in the system. In the case of GCS, exactly one instance for every artifact class is considered. Therefore each artifact typed attribute has only two values: undefined or referring to the only instance.

The component automaton generator 112 adds transitions to the component automata g based on the precondition and effect of the corresponding service. For example, if a service changes an attribute from undefined to defined, a transition of the service's name is added to connect the two states. The attribute financialOrderState exhibits the most complicated automaton in the component automaton 200 displayed in FIG. 2. Transitions drawn by dashed lines are uncontrollable by the merchant, which are issued by Google or controlled by the shopping customer. For example, in the payment_declined state 210F, the controllable transition is the CancelOrder command 220F, while uncontrollable transitions 220N can lead to cancelled_by_google state 210G if the customer fails to provide a valid credit card in time. Another source of uncontrollable transitions is conditional effects. For example, the ChargeAndShipOrder command 220C may result in either charged state 210E or payment_declined state 210F. The command itself is controllable but the outcome is not, according to one embodiment. In this case, an intermediate virtual state 210I is added and the transition is split into two stages. The first stage connects the source state 210B to the intermediate virtual state 210I by the controllable transition 220C that represents the service. The second stage connects the intermediate virtual state 210I to a set of states 210F, 210E through uncontrollable transitions 220L, 220M. Each of these destination states 210F, 210E can represent a possible outcome of the conditional effect.

As a preliminary implementation, enumeration type and artifact class type attributes are used in Web2Exchange. Integer types are allowed. However, according to one embodiment, only equality checking in precondition/effect formulae is used. This is sufficient for GCS, according to one embodiment.

The following provides a description of the composition component 120 in the context of Google Checkout, according to various embodiments. The composition component 120 receives the business goal K 154 as the input. The component automaton selector 122 in the composition component 120 selects relevant component automata from the repository 114, and uses the composition operation component 124 to build the composite automaton G. Assume that the composition operator 124A is a parallel composition operator. According to one embodiment, two types of business goal specifications K can be used. The first is language based, as described herein. This case, the specification K is given as a regular expression over the alphabet of services in the artifact system. For example, RefundOrder 220H precedes CancelOrder 220E. The second type is state based. For example, the business goal K may be to reach the state 210E where attribute financialOrderState=charged and fulfillmentOrderState=delivered. Let g denote the set of component automata in the repository 114. The component automaton selector 122 selects the initial set of automata g' $\subseteq$ g and expands the initial set g' until all relevant component automata are included for composition. In the case of language based specifications K, processing can start with the attributes used in the preconditions and effects of the services in the regular expression. For state based specifications, the component automaton selector 122 selects the attributes used to express the desirable state.

Parallel composition synchronizes component automata on shared events, therefore, according to one embodiment, the set g' is expanded to include all component automata that share events with those in g', i.e., g'=g'$\cup$\{G|G$\in$g\g', $\exists$H$\in$g', $E_g \cap E_h \neq \emptyset$\}, where $E_g$ and $E_h$ denote the event sets of G and H, respectively. The processing continues to expand the set g' until no new component automata g can be added, according to one embodiment.

The component automaton selector 122 can include an optional pruning step that can reduce the number of component automata selected in exchange for less flexible solutions. For example, dead states can be pruned in each component automaton, which are states not reachable from the initial state or states that cannot reach the goal state specified in the business goal K. This pruning does not reduce alternative paths in the composite automaton G to reach the goal state, but the composite automaton G may become undefined should the execution lead to those dead states unexpectedly. In addition, alternative paths can be sacrificed for a smaller composite automaton. As an analogy, with a composition task like map navigation, only one path may be desired rather than numerous alternatives.

The computational complexity of the composition component depends on the size of the final composite automaton G. For example, if the composition operation component uses parallel composition, which constructs the Cartesian product for the state sets of all automata involved in the operation, the Cartesian product may dominate the computation. With many shared events among component automata, in practice, the state space is much smaller than the full Cartesian product. Pruning further reduces the number of component automata in the final composite automaton G. With the goal of financialOrderState=charged and fulfillmentOrderState=delivered for GCS, experimental results of composition component 120 selected 20 component automata g' when parallel composition was used as the composition operator 124A. In experimental results for the GCS illustration, the composite automaton G had 98 states and 134 transitions.

The following provides a description of the control component 130 in the context of Google Checkout, according to various embodiments. Given a business goal K 154, which according to one embodiment is a control specification, in a regular language, a supremely controllable non-blocking sublanguage $K^{\uparrow C}$ can be synthesized automatically using FIG. 3, according to one embodiment. In this illustration, the system, as represented by the composite automaton G, is a parallel composite automaton, according to one embodiment. A business goal K, which is represented as a state-based control specification, can be translated into a language-based specification. Multiple control specifications can be unified by language intersection. Next a few business goal K 154 examples for GCS are presented according to various embodiments.

For example, assume for the sake of illustrating various embodiments in the context of Google Checkout that the merchant's goal state is financialOrderState=charged and fulfillmentOrderState=delivered. The control synthesis operation component 132 can simply mark the corresponding states as terminal. However, according to one embodiment, this specification is not controllable according to condition 1, because the component automaton 200 for financialOrderState can go to the cancelled_by_google state 210G unavoidably. Using FIG. 2 as an illustration, FIG. 3 will iteratively remove states cancelled_by_google 210G, reviewing 210C, undefined 210A, among others, and output an empty language. According to one embodiment, the state financialOrderState=cancelled_by_google 210G and fulfillmentOrderState≠delivered are marked as terminal too. The new specification $K^{\uparrow C}$, according to one embodiment, is controllable.

In contrast, with the same goal, planning algorithms may choose to ship the order before charging the customer, or before the payment is confirmed, because charging and shipping are independent services. Re-planning after reaching the payment_declined state 210F may be too late. Therefore, according to one embodiment, the charged state 210E is added as a precondition for shipping, but this is more restrictive than the real semantics are. It may be more flexible to model the semantic as is and handle various business objectives using control specifications. Another example is the execution ordering between RefundOrder 220H and CancelOrder 220E. The documentation for Google Checkout indicates that API reference allows both APIs to take place at the charged state 210E, but somewhere else in the Google Checkout document there is a note that RefundOrder 220H must precede CancelOrder 220E. This document inconsistency can be addressed by a regular expression {*RefundOrder*CancelOrder*}.

Business rules can be translated into language specifications, according to one embodiment. As discussed herein, according to various embodiments, the states in the composite automaton G that satisfy the condition 1 are found, and all of its outgoing transitions except the one representing the service to be invoked are removed.

According to one embodiment, the business goal K 154 is a specification. According to one embodiment, the composite automaton G may or may not be controllable with respect to the business goal K 154. If the composite automaton G is controllable with respect to the business goal K 154, the control synthesis operation component 132 can be used to provide a supervisor S, and it guarantees successful termination, according to one embodiment.

Since, according to various embodiments, the control synthesis operation component 132 can be used to determine if a composite automaton G is controllable, the system 100 (FIG. 1) can be used to analyze the soundness of the existing artifact system as reflected by the component automata g and complete the rule set as specified by the business goal K 154 with additional rules as specified by the supervisor S.

The following provides a description of the execution component 140 in the context of Google Checkout, according to various embodiments. The execution engine 142, according to one embodiment observes the system state of the composite automaton G, and invokes services as needed according to the supervisor S, which is also referred to as a supremely controllable non-blocking sublanguage $K^{\uparrow C}$. According to one embodiment, the execution engine 142 follows the transition rules indicated by the supervisor S. According to one embodiment, a supervisor S that does not block any controllable transitions is provided by using Supervisor Control Theory as applied to artifacts represented with automata.

Method

Figure 4:
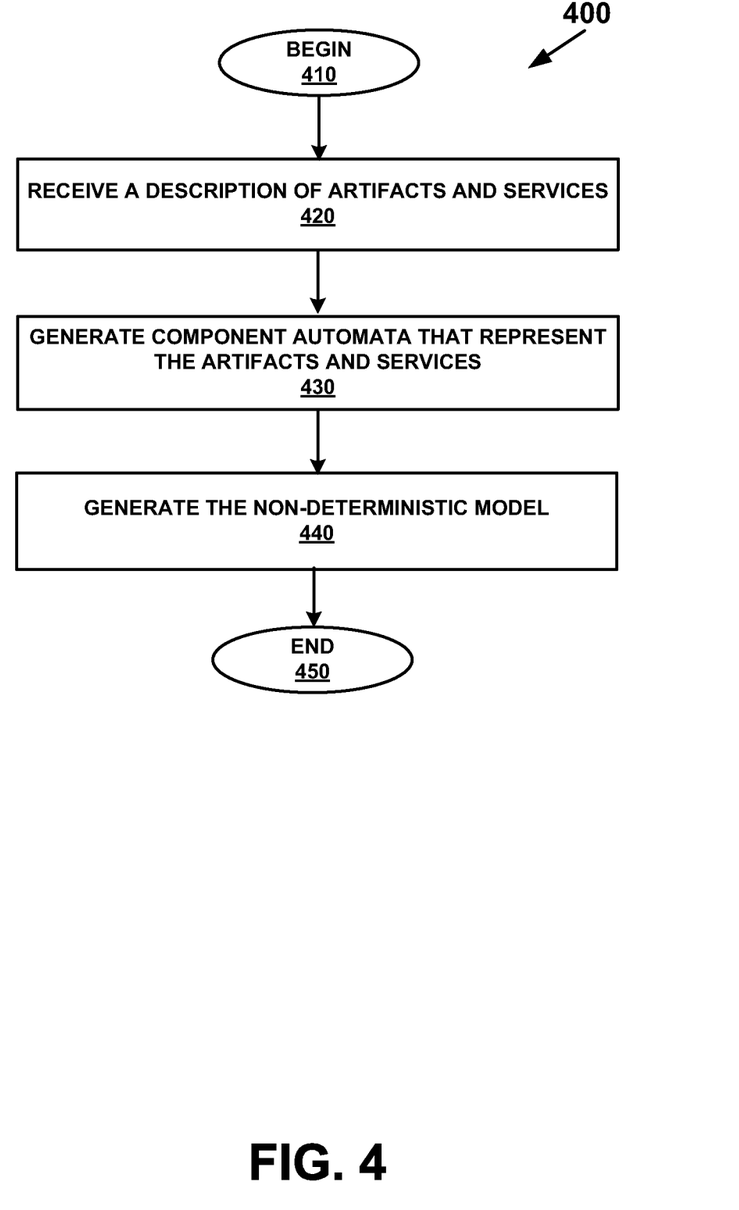
FIG. 4 is a flowchart of a method for generating a non-deterministic model of an artifact system for a received goal, according to one embodiment.

FIG. 4 is a flowchart 400 of a method for generating a non-deterministic model of an artifact system for a received goal, according to one embodiment. Although specific operations are disclosed in flowchart 400, such operations are exemplary. That is, embodiments of the present invention are well suited to performing various other operations or variations of the operations recited in flowchart 400. It is appreciated that the operations in flowchart 400 may be performed in an order different than presented, and that not all of the operations in flowchart 400 may be performed.

The flowchart 400 is described in the context of FIG. 1.

In step 410, the method begins.

In step 420, a description of artifacts and services 152 associated with an original version of a process is received. For example, artifacts and services 152 as depicted in Tables 1-3 for a process, such as Google Checkout, can be received by a component automaton generator 112 associated with an artifact modeling component 110. According to one embodiment, the received artifacts and services 152 are for an original version of the process.

In step 430, component automata g' that represent the artifacts and services 152 are generated. For example, the component automaton generator 112 generates the component automata g'. According to one embodiment, there is one component automaton for each artifact. For example, FIG. 2 depicts one component automaton 200 for the financialOrderState attribute. In this case, "financialOrder" is an example of an artifact. "financialOrder State" and "fulfillment State" are examples of attributes of the "financialOrder" artifact.

The states 210 of the component automaton 200 depicted in FIG. 2 represent potential values, such as undefined, reviewing, chargeable, payment_declined, cancelled, charged, and cancelled_by_google, of the financialOrderState artifact attribute and transitions 220 between the states 210 represent services, such as NewOrderNotification, AuthorizeOrder, ChargeAndShipOrder, CancelOrder, RefundOrder, that operate on the values.

In step 440, a new version of the process is generated by automatically generating a composite automaton G, which includes the component automata g', based on the received goal, wherein the composite automaton G provides a non-deterministic model of the new version of the process. For example, the component automaton selector 122 can select component automata g' from a set of available component automata g stored in a repository 114 based on a merchant's business goal K 154 so that the selected component automata g' comply with the merchant's business goal K 154. The composition operation component 124 generates a composite automaton G based on the selected component automata g', for example, using a parallel composition operation as defined by definition 7.

G, according to one embodiment, is a new version of a process that has been tailored to the merchant's goals K. In one embodiment, G is a composite automaton. G provides a model of the new version of the process based on the merchant's goal K, according to one embodiment. G is generated based on a subset g' of all of the attributes and services g that are associated with the original version of the process, according to one embodiment. The subset g' may include any where from one to all of the attributes and services g. The subset g' is selected from the attributes and services g based on the merchant's goal K. Therefore, G is capable of being integrated into the merchant's system.

Generating the new version of the process based on the merchant's goal K is also referred to as "synthesizing the process."

In step 450, the method ends.

According to one embodiment, a supervisor S is automatically generated based on the composite automaton G and the business goal K 154. The business goal K 154 is a control specification and the supervisor S is a supremely controllable non-blocking sublanguage $K^{\uparrow C}$ that includes state transition pairs that specify whether the transitions of the pairs can be executed for respective states, thus, enabling control of the model G.

According to one embodiment, a new version of the business process, such as Google Checkout, is automatically executed by controlling the execution of the composite automaton G based on the supervisor S. More specifically, a new version of the process, such as Google Checkout, is executed and controlled based on a supervisor S that complies with the merchant's business goals K 154, such as Goal state FinancialOrderState=charged and Fulfillment order state=delivered as depicted in Table 4. Therefore, although the model, in the form of a composite automaton G, according to one embodiment, is "uncontrolled" and "non-deterministic" by itself, the model is "controllable" by a supervisor S, according to one embodiment. Therefore, according to various embodiments, G is also referred to as an "uncontrolled process" and G in combination with S is referred to as a "controlled process."

Although various embodiments are described in the context of generating a new version of the process, embodiments are also well suited for generating a non-deterministic model of the process that is not a new version.

According to one embodiment, the composite automaton G is a specification. According to one embodiment, the composite automaton G may or may not be controllable with respect to the business goal K 154. If the composite automaton G is controllable with respect to K, the control synthesis operation component 132 can be used to provide a supervisor S, and it guarantees successful termination, according to one embodiment.

Since, according to various embodiments, the control synthesis operation component 132 can be used to determine if a composite automaton G is controllable, the system 100 (FIG. 1) can be used to analyze the soundness of the existing artifact system as reflected by the composite automaton G and complete the rule set as specified by the business goal K 154 with additional rules as specified by the supervisor S.

In the event that control synthesis fails, according to one embodiment, the system 100 can provide output to a human 156 associated with the merchant who can provide additional business goals K 154 so that another iteration of the composition component 120 and control component 130 can be performed.

If the merchant provides an incomplete set of business goals K 154, the system 100 can be used to complete the business goals K 154, for example, by feeding the output of the control synthesis operation component 132 back into the composition component 120, for example, through a person 156 associated with a merchant. The person 156 can provide additional business goals K 154 to the composition component 120.

Any one or more of the embodiments described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments of the present invention.

Although many embodiments were described in the context of an implementation using Google Checkout as the business process, embodiments are well suited for other types of business processes and processes that are not business processes.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method comprising:
   receiving a goal of a business entity;
   receiving a description of artifacts and services associated with an original version of a process, wherein the original version of the process is not adapted to the received goal of the business entity;
   automatically generating component automata that represent the artifacts and services, wherein there is one component automaton for each attribute of an artifact and wherein states of a particular component automaton represents potential values of a particular attribute and transitions between the states represent services that operate on the values;
   automatically generating a composite automaton using the component automata and, based on the received goal, wherein the composite automaton provides a non-deterministic model of the process that is adapted to the received goal of the business entity;
   automatically generating a supervisor based on the composite automaton and the received business goal, the supervisor comprising a plurality of state transition pairs, each state transition pair specifying whether a particular transition can be executed for a particular state of the composite automaton, wherein generating the supervisor is further based on a determination that the received goal is controllable according to one or more specified conditions; and
   executing, by an execution engine using the supervisor, the composite automaton to automatically perform the process for the business entity, the execution engine using the supervisor to control execution of the composite automaton.

2. The method as recited by claim 1, further comprising: selecting the component automata from a repository of available component automata based on the received goal, wherein the selected component automata include at least one of the available component automata in the repository.

3. The method as recited by claim 1, further comprising: determining whether the composite automaton is controllable with respect to the goal; and
generating a failure report in response to a determination that the composite automaton is not controllable with respect to the goal.

4. The method as recited by claim 3, further comprising: generating the supervisor in response to a determination that the composite automaton is controllable with respect to the goal.

5. A system comprising:
a hardware processor; and
a non-transitory storage medium storing instructions executable on the hardware processor to:
receive a goal of an entity;
receive a description of artifacts and services associated with an original version of a process;
generate component automata that represent the artifacts and services, wherein there is one component automaton for each attribute of an artifact and wherein states of a particular component automaton represents potential values of a particular attribute and transitions between the states represent services that operate on the values;
generate a composite automaton using the component automata and the received goal, wherein the composite automaton provides a non-deterministic model of the process;
generate a supervisor based on the composite automaton and the received goal, the supervisor comprising a plurality of state transition pairs, wherein each state transition pair of the supervisor specifies whether a particular transition can be executed for a particular state of the composite automaton, wherein generating the supervisor is further based on a determination that the received goal is controllable according to one or more specified conditions; and
execute, by an execution engine using the supervisor, the composite automaton to automatically perform the process for the entity, the execution engine using the supervisor to control execution of the composite automaton.

6. The system of claim 5, the instructions executable to: select the component automata from a repository of available component automata based on the goal, wherein the selected component automata include at least one of the available component automata in the repository.

7. The system of claim 5, wherein the entity is a business entity, and wherein the process is a commercial activity.

8. The system of claim 7, wherein the original version of the process is not adapted to the goal of the business entity.

9. The system of claim 5, the instructions executable to determine whether the composite automaton is controllable with respect to the goal.

10. The system of claim 9, the instructions executable to generate a failure report in response to a determination that the composite automaton is not controllable with respect to the goal.

11. The system of claim 9, the instructions executable to generate the supervisor in response to a determination that the composite automaton is controllable with respect to the goal.

12. A non-transitory computer readable storage medium having computer-executable instructions stored thereon, the instructions executable by a computer system to:
receive a goal of an entity;
receive a description of artifacts and services associated with an original version of a process;
automatically generate component automata that represent the artifacts and services, wherein there is one component automaton for each attribute of an artifact and wherein states of a particular component automaton represents potential values of a particular attribute and transitions between the states represent services that operate on the values;
automatically generate a composite automaton using the component automata and the received goal, wherein the composite automaton provides a non-deterministic model of the process;
generate a supervisor based on the composite automaton and the received goal, the supervisor comprising a plurality of state transition pairs, wherein each state transition pair of the supervisor specifies whether a particular transition can be executed for a particular state of the composite automaton, wherein generating the supervisor is further based on a determination that the received goal is controllable according to one or more specified conditions; and
execute, by an execution engine using the supervisor, the composite automaton to automatically perform the process for the entity, the execution engine using the supervisor to control execution of the composite automaton.

13. The non-transitory computer readable storage medium as recited by claim 12, the instructions executable to:
select the component automata from a repository of available component automata based on the goal, wherein the selected component automata are a subset of the available component automata in the repository.

14. The non-transitory computer readable storage medium as recited by claim 12, wherein the entity is a business entity, and wherein the process is a commercial activity.

15. The non-transitory computer readable storage medium as recited by claim 14, wherein the original version of the process is not adapted to the goal of the business entity.

16. The non-transitory computer readable storage medium as recited by claim 12, the instructions executable to:
determine whether the composite automaton is controllable with respect to the goal; and
generate a failure report in response to a determination that the composite automaton is not controllable with respect to the goal.

17. The non-transitory computer readable storage medium as recited by claim 16, the instructions executable to:
generate the supervisor in response to a determination that the composite automaton is controllable with respect to the goal.

* * * * *